Sept. 10, 1963 G. E. BORGARD 3,103,261
AUTOMATIC BRAKE ADJUSTER
Filed April 3, 1961 2 Sheets-Sheet 2
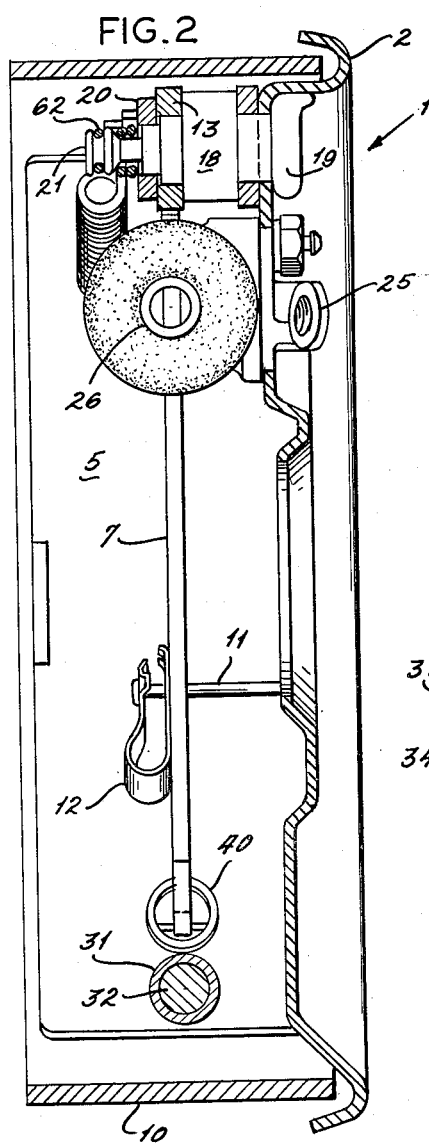
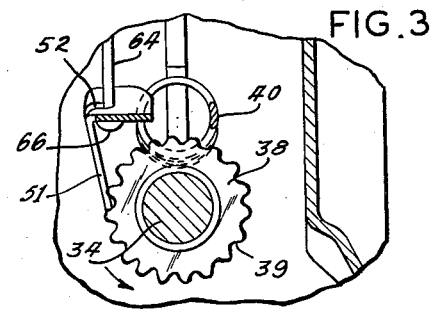
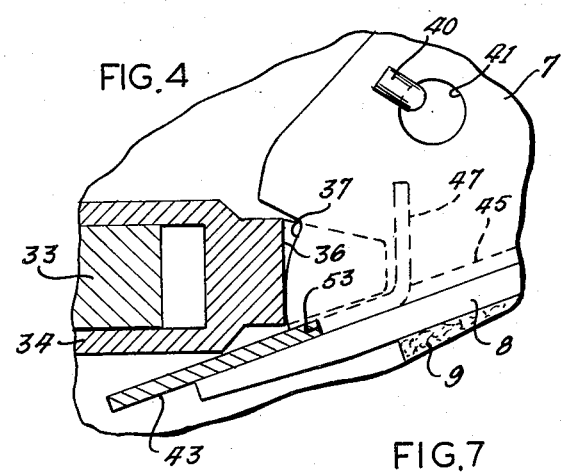
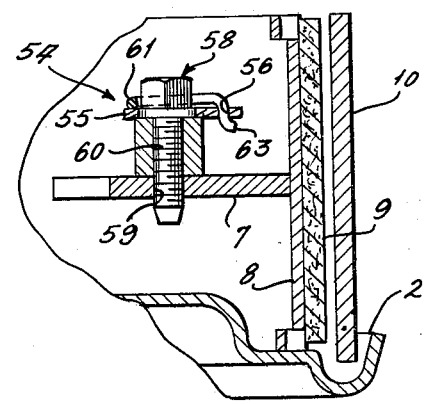
INVENTOR:
GLENN E. BORGARD
BY Gravely, Lieder & Woodruff
ATTORNEYS.

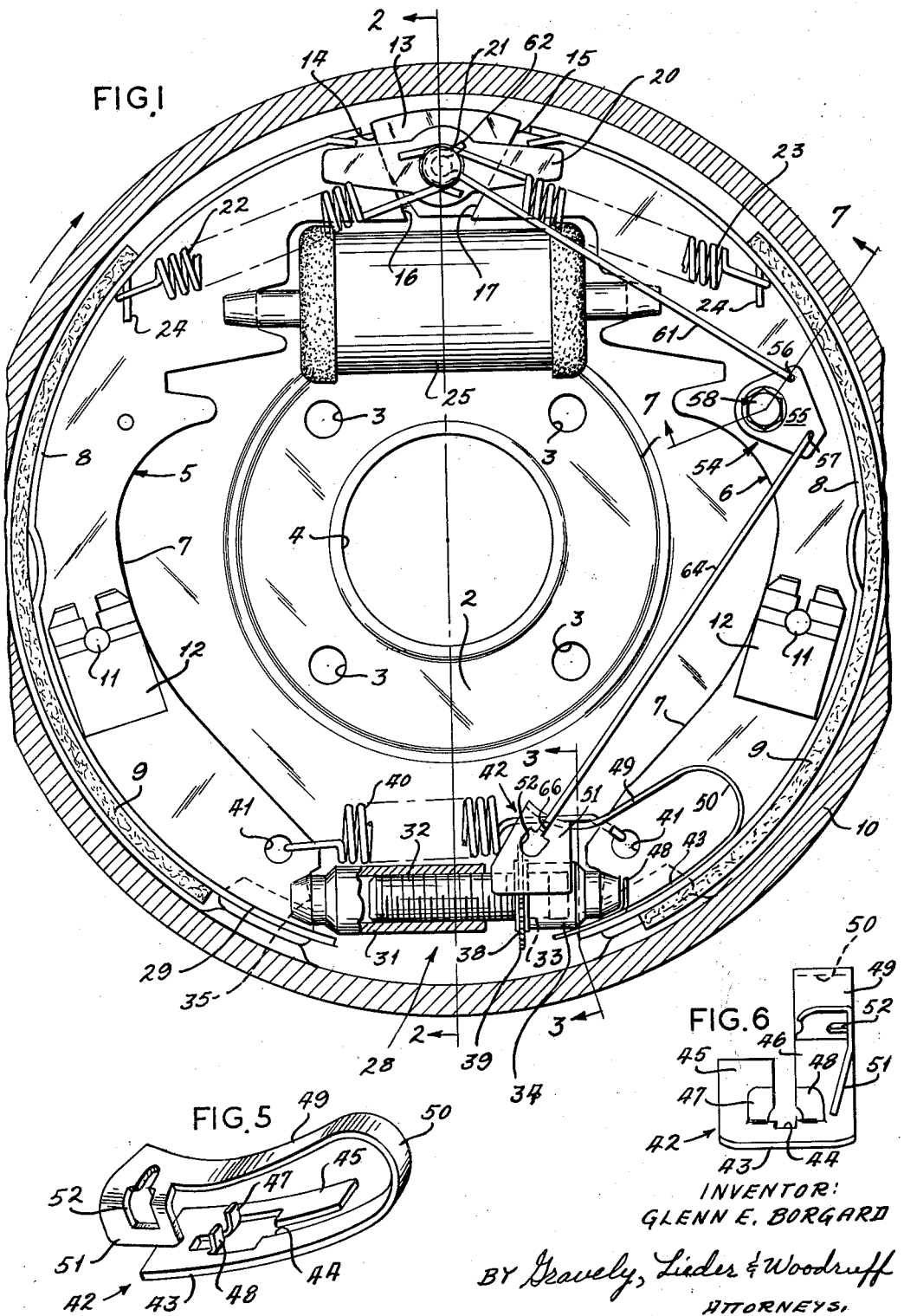

United States Patent Office 3,103,261
Patented Sept. 10, 1963

3,103,261
AUTOMATIC BRAKE ADJUSTER
Glenn E. Borgard, Overland, Mo., assignor to Wagner Electric Corporation, St. Louis, Mo., a corporation of Delaware
Filed Apr. 3, 1961, Ser. No. 100,120
9 Claims. (Cl. 188—79.5)

This invention relates to automotive braking systems and more particularly to compound braking mechanism having automatic means for adjusting the articulated shoe ends therein.

In past automatic brake adjusters for compound braking mechanism, one of the undesirable features was that the component parts of said mechanism were employed to impart the driving force to said adjusters, and as a result, forces in opposition to said driving force were also created which acted upon said component parts to restrict the centering tendencies of articulated shoes in said mechanism. In effect, the past adjusters were ineffective and inoperable to a point which affected the operational characteristics of a self-centering compound braking mechanism. Another undesirable feature of past automatic brake adjusters to which the component parts of compound braking mechanism imparted the driving force was the inability of said adjuster to fail safely, i.e., if the adjuster failed, the entire compound braking mechanism also failed since said component parts not only functioned in said braking mechanism but were also integral parts of said brake adjusters. Further, in past brake adjusters wherein a component part of the braking mechanism was also an integral part of said adjuster, the undesirable feature of complex and time consuming assembly was inherent. Heretofore, a simple, economical automatic brake adjuster, having a minimum of parts capable of being simply and easily assembled, has not yet been provided which would overcome the abovementioned undesirable features.

An object of the present invention is to provide automatic adjuster means for a compound braking mechanism which does not affect the centering tendencies of said mechanism.

Another object of the present invention is to provide automatic adjuster means for a compound braking mechanism which does not materially affect the geometry of said mechanism.

Another object of the present invention is to provide automatic adjuster means which is self-contained on one brake shoe of a compound braking mechanism.

Another object of the present invention is to provide automatic adjuster means which, upon failure, does not affect the operational characteristics of the braking mechanism.

Another object of the present invention is to provide an adjusting lever in which the driving force is inherently generated.

Another object of the present invention is to provide automatic adjusting means having a driving force independent of the component parts of the braking mechanism.

Still another object of the present invention is to provide an adjusting lever having smooth, uniform driving movement relative to the component parts of the braking mechanism.

A still further object of the present invention is to provide automatic adjusting means which obviate frictional interference relative the ordinary function of the component parts of the braking mechanism.

And a still further object of the present invention is to provide an adjusting lever which is highly resistant to lateral deflection.

These and other objects and advantages will become apparent hereinafter.

Briefly, the present invention provides an adjusting device between the articulated brake shoe ends of a compound braking mechanism including a rotatable member for controlling the length of said adjusting device, and adjusting means positioned on one of said brake shoes for driving connection with said rotatable member in response to radial shoe movement.

The invention also consists in the parts and in the arrangements and combination of parts hereinafter described and claimed. In the accompanying drawings which form part of this specification and wherein like numerals and symbols refer to like parts wherever they occur:

FIG. 1 is a plan view, partially in section, of a braking mechanism embodying the invention therein, FIG. 2 is a cross-sectional view taken along line 2—2 of FIG. 1, FIG. 3 is a partial sectional view taken along line 3—3 of FIG. 1, FIG. 4 is an enlarged partial sectional view illustrating the engagement between the adjusting lever and an articulated shoe end, FIG. 5 is an isometric view of the adjusting lever, FIG. 6 is a left-end view of the adjusting lever of FIG. 1, FIG. 7 is a partial sectional view taken along line 7—7 of FIG. 1.

Referring to FIGS. 1–4, the numeral 1 indicates a compound braking mechanism embodying the teachings of U.S.P. 2,755,889 issued July 24, 1956, to S. Schnell, the construction and operation of which are briefly described hereinafter in conjunction with the embodiment of the instant invention.

The braking mechanism 1 includes a backing plate 2 having a plurality of small apertures 3 adjacent a centrally located larger aperture 4 for securing said backing plate to the vehicle axle (not shown) or other supporting structure. Interchangeable brakeshoes 5 and 6 are provided with a web 7 and a table 8 having friction lining 9 secured thereto for frictional engagement with a brake drum 10, and said shoes are supported on and maintained in sliding engagement with the backing plate 2 by the usual arrangement of guide pins 11 and retaining clips 12.

A substantially keystone-shaped anchor block 13 is provided with sides 14 and 15 which are normally engaged by adjacent expansible or upper ends 16 and 17 of shoes 5 and 6, respectively, and said anchor block is rotatably received on an anchor pin 18 which is fastened to the backing plate 2 by suitable means, such as an upset weld at 19. A shoe guide 20 is also carried on the anchor pin 18 in abutment with the anchor block 13 and in sliding engagement with the expansible shoe ends 16 and 17, and an integrally formed anchor block extension 21 is provided to receive one end of return springs 22 and 23, the other end of each being received by hooks 24 in the table 8 of shoes 5 and 6, respectively. In this manner, the ends of return springs 22 and 23 received on extension 21 abut the shoe guide 20 serving to prevent displacement of said shoe guide and the anchor block 13 from the anchor pin 18.

A conventional wheel cylinder 25 for actuating shoes 5 and 6 into frictional engagement with the drum 10 is mounted on the backing plate 2 adajacent the anchor block 13 and is provided with conventional slotted push rods 26 which extend into cooperating slots 27 formed in the web 7 of said shoes.

A conventional adjusting device or strut 28 is positioned between the adjacent articulated or lower ends 29 and 30 of shoes 5 and 6, respectively, and includes an internally threaded female member 31 and a threaded male member 32, said male member also having an unthreaded sleeve portion 33 which is rotatably received in a sleeve nut 34. The ends of the female member 31 and sleeve nut 34 are provided with grooves 35 and 36 which cooperatively receive slots 37 provided in the web 7 of the articulated shoe ends 29 and 30, respectively, thereby obviating rotation of said female member and sleeve nut. An adjusting member of star wheel 38 having a notched or irregularly shaped peripheral surface 39 is integrally formed with the male member 32 intermediate the threaded and sleeved portions thereof for adjusting the position of the female member 31, i.e., the distance between the articulated shoe ends 29 and 30, and a coil spring 40 is connected between apertures 41 in the shoe webs 7 to maintain engagement between said articulated shoe ends and the adjusting device 28.

Referring now to FIGS. 1, and 4–6, a leaf type spring or adjusting lever 42, having a generally U-shaped convolution, is provided with a base portion 43 which is slightly curved to substantially conform with the arc or curvature of the shoe table 8. The base 43 is provided with a shoe web receiving slot 44 forming integral, spaced legs 45 and 46 adjacent each side of said slot, and shoe web retaining stops 47 and 48 are integrally formed from said base legs being respectively positioned adjacent the sides of the slot 44 and equally spaced from the base of said slot. The base leg 46 of the lever 42 is integrally connected with a resilient upper or pawl arm 49 by a curved portion 50, and the free end of said pawl arm is provided with an integral depending detent or tooth 51, said pawl arm and detent having a connecting rod receiving slot 52 therein. As shown in FIG. 3, the depending tooth 51 is formed at an acute angle relative to the pawl arm 49 for lateral force purposes which will be set forth hereinafter.

The base 43 of the adjusting lever 42 is positioned in abutment with the shoe table 8, and the shoe web 7 is received in the slot 44. The shoe webs 7 are also slotted at 53 to receive the base portion of the slot 44 of the lever 42 so that said shoe web and slot 44 dovetail or interlock thereby positively retaining said lever 42 against vertical displacement. Further, the base 43 is abuttingly interposed between the end of the sleeve nut 34 and the shoe table 8 to also retain the lever 42 against vertical displacement. The stops 47 and 48 engage opposite sides of the shoe web 7 to substantially obviate lateral movement or cocking of the adjusting lever relative the shoe table 8, and said stops are also positioned for abutting engagement with the end of the sleeve nut 34 to prevent horizontal displacement of said lever. Of course, the abutment between the base 43 and the shoe table 8 also serves to prevent cocking of the lever 42 in conjunction with the abutting engagement of the stops 47 and 48 and the shoe web 7.

Referring to FIGS. 1 and 7, a pivot assembly, indicated generally at 54, is provided with a bell crank 55 having predeterminately spaced apertures 56 and 57 therein, and said bell crank is pivotally received on a screw and spacer assembly 58. The screw and spacer assembly 58 is fixedly positioned in an aperture 59 provided in the web 7 of the shoe 6 by suitable means, such as self-cutting screw threads 60, a similar aperture being also provided in the web 7 of shoe 5 for the sake of shoe interchangeability. A connecting link or rod 61 is provided with a hook 62 on one end which is received on the anchor block extension 21, and the other end thereof is provided with an S-shaped portion 63 which is received in locking engagement by the bell crank aperture 56. Another connecting link or rod 64 is also provided with an S-shaped portion 65 on one end which is received in locking engagement in the cooperating bell crank aperture 57, and the other end thereof is provided with a hemispherically shaped retaining head 66. Since the adjusting lever 42 is retained against displacement on the shoe 6, as previously described, the pawl arm 49 is biased from the lever base portion 43 to pivotally receive the connecting rod retaining head 66 in the pawl arm slot 52; therefore, the compressive force of the pawl arm 49 serves to maintain said connecting rod retaining head in said pawl arm slot against displacement and also serves to bias the detent 51 into a ratchet type, driving engagement with the notched peripheral surface 39 of the star wheel 38.

The driving engagement effected by the inherent compressive force of the pawl arm 49 also serves to create an inherent lateral force on said pawl arm when the tooth 51 is engaged with the notched peripheral surface 39 of the star wheel 38. Since the tooth 51 is formed at an acute angle with the inherently resilient pawl arm 49, FIG. 3, the driving engagement between said tooth and the notched star wheel 38 laterally displaces said pawl arm in a direction away from the backing plate 2 thereby creating a lateral reaction force to effectively maintain said driving engagement.

*Operation*

In order to illustrate the operation and adjustment cycle for the compound braking mechanism 1, assume the vehicle is decelerated in a reverse direction, as indicated by the arrow in FIG. 1 showing clockwise rotation of the drum 10, and also assume the friction material 9 is sufficiently worn to warrant an adjustment of said braking mechanism.

When the vehicle operator effects reverse deceleration, the wheel cylinder 25 is actuated to move shoes 5 and 6 and frictionally engage the friction material 9 with the drum 10 thereby energizing the braking mechanism 1 in the reverse direction. The expansible shoe end 17 is moved away from the anchor block side 15, and the other expansible shoe end 16 remains in abutment with the anchor block side 15. The reverse braking forces generated by the energization of the braking mechanism 1 are transmitted from the shoe 6 through the adjusting means 28 to the shoe 5 and, of course, the anchor block 13. In this manner, the shoe 6 is displaced radially and circumferentially, and the pivot assembly 54 is also displaced radially and circumferentially therewith. The radial and circumferential displacement of the pivot assembly 54 causes the connecting rod 61 to pivot the bell crank 55 relative to the screw and spacer assembly 58, i.e., to pull said bell crank in a counterclockwise direction; therefore, the pivotal movement of said bell crank pulls the connecting rod 64 upwardly placing a tensile force thereon which is opposed by the compressive force of the distensible adjusting lever pawl arm 49. In this manner, the pawl arm 49 is moved upwardly relative to the notched peripheral surface 39 of the star wheel 38, and the inherent lateral force of said pawl arm causes the tooth 51 to engage the next successive notch of the star wheel peripheral surface 39.

When the braking mechanism 1 is de-energized, the compressive force of return spring 23 causes the shoe 6 to re-engage the anchor block side 15, and in this manner, the pivotal assembly 54 is returned to its original position along with the component parts of said braking mechanism. As the pivotal assembly 54 is returned to its original position, the inherent compressive force of the adjusting lever pawl arm 49 moves the tooth 51 downwardly in driving engagement with the star wheel peripheral surface 39 to drive or rotate the star wheel 38 in the direction of the arrow in FIG. 3. As previously mentioned, the inherent lateral force of the adjusting lever pawl arm 49 maintains the tooth 51 in driving connection with the star wheel notched peripheral surface 39. Rotation of the star wheel 39 moves the female and male members 31 and 32 of the adjusting device 28 apart effectively spreading the articulated shoe ends 29 and 30 to again reposition the shoes 5 and 6 relative to the drum 10 and thereby adjust the braking mechanism 1.

When the friction lining 9 again becomes sufficiently worn to warrant a subsequent adjustment of the braking mechanism 1, the adjusting lever 42 will again be actuated into driving engagement with the peripheral surface 39 of the star wheel 38 to effect adjustment of said braking mechanism in the above described manner.

Although the operation and construction has been described for a left side braking mechanism, it is apparent that for a right braking mechanism, in which reverse rotation is counterclockwise, the brake shoes 5 and 6, the anchor block 13, and the adjusting device 28 are rotated 180°. A right hand adjusting lever having integral parts exactly opposite of the adjusting lever 42 is also required for positioning on the reverse shoe of a right hand braking mechanism in driving engagement with the adjusting device.

From the foregoing, it is obvious that the automatic adjusting means for the braking mechanism 1 does not affect the centering tendencies of said mechanism. Since none of the component parts of the braking mechanism 1 are employed to impart the driving force to the adjusting lever 42, i.e., the force causing the tooth 51 to drive the star wheel 38 in an adjusting direction, there are no reaction forces in opposition to said driving force on said braking mechanism component parts to restrict the centering tendencies of the articulated shoes 5 and 6; therefore, the self-centering operational characteristics of said braking mechanism is unimpeded.

In addition to the above, it is obvious that the automatic adjusting means for the braking mechanism 1 does not materially affect the geometry of said mechanism. Since there are no reaction forces on the component parts of the braking mechanism 1 in opposition to the driving force imparted by the adjusting lever 42, it is obvious that said adjusting lever and actuating mechanism therefor can be employed with a conventional braking mechanism, including such mechanisms not having self-centering features, without materially affecting the geometry of said braking mechanism.

It is apparent that the automatic adjusting means is self-contained on one shoe of the braking mechanism 1. The expanse of the base portion 43 of the lever 42 engaged with the shoe table 8 as well as the stops 47 and 48 engaged with shoe web 7 prevent cocking of said lever. The interlocking of the slot 44 in the lever 42 with the slot 53 in the shoe web 7 as well as the engagement of the end of the sleeve nut 34 with the lever base portion 43 effectively obviates vertical displacement of said lever. Further, the abutment between the stops 47 and 48 and the end of the sleeve nut 34 obviates horizontal displacement of said lever from the shoe 6; therefore, the lever 42 is contained only on the shoe 6.

It is also apparent that failure of the automatic adjusting means for the braking mechanism 1 does not affect the normal operational characteristics thereof, i.e., said automatic adjusting means will "fail safely." Since the lever 42 is not dependent upon the braking mechanism component parts to impart the driving force to effect adjustment of the braking mechanism 1, failure of the lever 42 and/or associated actuating parts will not affect the normal operating characteristics of any braking mechanism component part or the braking mechanism itself. In other words, the braking mechanism 1 can be employed for subsequent braking operations even though the adjusting means therefor have failed.

It is readily apparent that the lever 42 is provided with a resilient distensible pawl arm 49, the inherent compressive force of which generates the driving force to drivingly engage the tooth 51 with successive notches in the star wheel peripheral surface 39 to rotate the star wheel 38, move apart the female and male members 31 and 32 of the adjusting device 28, and spread the articulated shoe ends 29 and 30. It follows, therefore, that since the resiliency of the pawl arm 49 inherently generates the driving force necessary to adjust the braking mechanism 1, said driving force is independent of any braking mechanism component parts or any forces generated thereby.

From the above, it is also readily apparent that the inherent resiliency of the pawl arm 49 provides a substantially smooth, uniform driving movement for the tooth 51 relative the braking mechanism component parts. In other words, the driving force of the pawl arm 49 is constant and is not variable in accordance with the degree of adjustment, i.e., the distance between the articulated shoe ends 29 and 30. Further, since the lever 42 functions independently of the braking mechanism component parts, there is no frictional interference relative the ordinary function of said component parts which would impair the smoothness and uniformity of the pawl arm driving movement.

It is also readily apparent that the lever 42 is highly resistant to lateral deflection. The width of the pawl arm 49 inherently resists lateral deflection thereof relative to the backing plate 2. Further, since the tooth 51 is formed at an angle with said pawl arm, the driving engagement between said tooth and the notched peripheral star wheel surface 39 creates a force to laterally displace said pawl arm, and the inherent resistance of said pawl arm to lateral displacement creates an opposing reaction force which serves to effectively maintain the aforementioned driving engagement.

The foregoing description and accompanying drawings have been presented only by way of illustration and example, and changes and alterations of the instant disclosure, which will be apparent to one skilled in the art, are contemplated as within the scope of the instant invention which is limited only by the claims which follow.

What is claimed is:

1. Means for mounting an actuating mechanism for an adjusting device having an end connected with the articulated end of a brake shoe, said mounting means comprising a base portion received on the table of said shoe, a slot in said base portion to receive the web of said shoe and obviate lateral displacement of said mechanism relative to said shoe, tab means on said base portion positioned for abutment with the end of said adjusting device to obviate horizontal displacement of said mechanism relative said shoe, said adjusting device end being adapted for abutment with said base portion to obviate vertical displacement of said mechanism relative said shoe.

2. Means for mounting an actuating mechanism for an adjusting device having an end connected with the articulated end of a brake shoe, a base portion received on the table of said shoe, a slot in said base portion for receiving the web of said shoe and for obviating lateral displacement of said mechanism from said shoe, a recess in the web of said shoe for receiving the base of said base portion slot and for obviating vertical displacement of said mechanism from said shoe, and radial tab means formed on said base portion adjacent to said slot and positioned for abutment with the end of said adjusting device to obviate horizontal displacement of said mechanism from said shoe.

3. In an actuating mechanism for an adjusting device having an end connected with the articulated end of a brake shoe, mounting means comprising a bifurcated base portion received on the brake shoe web at the articulated shoe end to obviate lateral displacement of said actuating mechanism relative to said shoe, and radial tab means formed on said base portion, said adjusting device being adapted to abut said tab means and said base portion to prevent horizontal and vertical displacement of said actuating mechanism relative to said shoe.

4. The actuating mechanism according to claim 3 in which said tab means are struck from each portion of the bifurcated base portion for positioning on each side of said web.

5. In an automatic adjuster for a friction device having a pair of articulated brake shoes with adjacent expansible ends, the adjuster including a strut between one pair of articulated brake shoe ends, a threaded element received in said strut, a serrated wheel on said element, the improvement which comprises adjuster actuating means comprising a mounting portion including a base received on the web against the table at the articulated end of one of said shoes to prevent relative lateral movement therebetween, means on said base for abutment with the end of said strut for preventing radial and horizontal displacement of said actuating means from the table of said one shoe, said actuating means having a lever portion engageable with serrations on said wheel and a pre-loaded resilient portion integrally interconnecting said mounting portion and lever portion, operating means operatively connecting said lever portion and being associated with said one shoe to stress said resilient portion and disengage said lever portion from said wheel during actuation of said friction device, and said resilient portion returning said lever portion into engagement with said serrated wheel when said friction device is released, whereby said lever portion is adapted to engage a successive serration on said wheel and rotate said wheel and element to spread the articulated brake shoe ends.

6. In an actuating mechanism for an adjusting device to control relative displacement of articulated brake shoe ends, said actuating mechanism including a resilient control portion having lever means thereon normally positioned in engagement with said adjusting device, operating means responsive to brake shoe actuation to stress said resilient portion and deflect said lever means to a new position relative to said adjusting device whereby said resilient portion will drivingly reengage said lever means with said actuating device and actuate said adjusting device upon release of said operating means, said actuating mechanism also comprising a base portion integral with said resilient control portion and positioned in abutting engagement between the brake shoe table at the articulated end of one brake shoe and the adjusting device to prevent radial displacement of said actuating member when said resilient portion is stressed, groove means in said base portion received on the brake shoe web at the articulated end of the one brake shoe to prevent lateral displacement of said actuating member, and other means formed on said base portion for abutment with an end of said adjusting device to prevent horizontal displacement of said actuating mechanism.

7. The actuating mechanism according to claim 6 in which resilient control means comprises a spring steel strip and includes a pawl arm integrally carrying said lever means, said pawl arm having a predetermined width to resist lateral deflection of said lever means relative to the direction of normal deflection thereof due to brake actuation.

8. In an actuating mechanism for an adjusting device having outer ends articulating the adjacent ends of a pair of brake shoes and controlling relative displacement therebetween, said actuating mechanism including a resilient control portion having lever means normally engaged with said adjusting device and means responsive to brake shoe actuation for stressing said resilient control portion and deflecting said lever means to subsequently cause adjusting device actuation, said actuating mechanism comprising a base portion integral with said resilient control portion and firmly mounted at the end of one brake shoe to prevent displacement therefrom in response to stressing of said resilient control portion and actuation of said brake shoes and adjusting device, said base portion being held against the table at the end of said one brake shoe by abutment of said adjusting device therewith and having first means for abutment with an outer end of said adjusting device, and said base portion having second means straddling the web of said one brake shoe.

9. The actuating mechanism according to claim 8 in which said base portion extends from the end of said one brake shoe a substantial length and is curved to conform to the configuration of the table of said one brake shoe, and said resilient control portion is formed integral on said base portion in spaced relation from the point of abutment of said adjusting device.

References Cited in the file of this patent
UNITED STATES PATENTS

| | | |
|---|---|---|
| 2,938,610 | Dombeck et al. | May 31, 1960 |
| 2,978,072 | Burnett | Apr. 4, 1961 |